United States Patent Office 2,997,474
Patented Aug. 22, 1961

2,997,474
1-ARYL-ω-(4-ARYLPIPERAZINE)ALKANOLS
Paul A. J. Janssen, Antwerpse Steenweg 16',
Vosselaar, near Turnhout, Belgium
No Drawing. Filed Oct. 12, 1959, Ser. No. 845,631
9 Claims. (Cl. 260—268)

The present invention relates to a now group of piperazinealkanol derivatives and more particularly 1-aryl-ω-(4-arylpiperazine)alkanols of the general structural formula

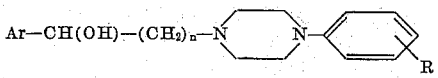

and the pharmaceutically acceptable non-toxic salts thereof, wherein Ar is a monocyclic aryl radical preferably of less than 9 carbon atoms; R is a member of the class consisting of hydrogen, halogen, methoxy, methyl, ethyl; and $n$ is three or four.

In the foregoing structural formula the radical Ar can represent a halophenyl radical (the halogen being preferably of an atomic number less than 18), and alkoxyphenyl radical (such as methoxyphenyl and ethoxyphenyl), and a monocyclic aromatic hydrocarbon radical (such as phenyl and methylphenyl). A preferred process for the preparation of the compounds of this invention employs the reduction of a ketone of the structural formula

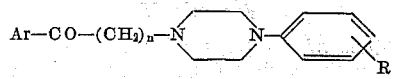

wherein Ar, R, and $n$ are defined as above with a metal hydride of the type (Alkali metal)ZH$_4$ in which Z is an element of periodic group III of an atomic number less than 14.

Another useful procedure for the preparation employs the alkaline hydrolysis (for example, using sodium hydroxide) of the compound of the structural formula

The dihydrohalide salt of this hydrogen compound is formed by the addition of 3 molecular equivalents of hydrogen halide to the corresponding benzylidene compound in acetic acid.

The compounds can also be prepared by the condensation of a compound of the type Ar—CHOH—(CH$_2$)$_n$—X with the compound of the type

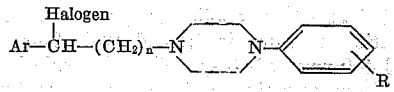

In this reaction Ar, R, and $n$ are defined as above and X is a readily replaceable electro-negative group, e.g. halogen and arylsulfonoxy group or an alkylsulfonoxy group.

The compounds of this invention are potent depressants of the central nervous system. They are hypnotics, tranquilizers, and analgesics and they augment the central nervous effects of barbiturates.

The organic bases of this invention form pharmaceutically acceptable non-toxic salts with a variety of inorganic and strong organic acids including sulfuric, phosphoric, hydrochloric, hydrobromic, hydroiodic, sulfamic, citric, lactic, maleic, malic, succinic, tartaric, cinnamic, acetic, benzoic, gluconic, ascorbic, and related acids.

They also form quaternary ammonium salts with a variety of organic esters of sulfuric, hydrohalic and aromatic sulfonic acids. Among such esters are methyl chloride and bromide, ethyl chloride, propyl chloride, butyl chloride, isobutyl chloride, benzyl chloride and bromide, phenethyl bromide, naphthylmethyl chloride, dimethylsulfate, diethylsulfate, methyl benzenesulfonate, ethyl toluenesulfonate, ethylene chlorohydrin, propylene chlorohydrin, allyl bromide, methallyl bromide, and crotyl bromide.

The compounds which constitute this invention and the methods for their preparation will appear more fully from a consideration of the following examples, which are given for the purpose of illustration only and are not to be construed as limiting the invention in spirit or in scope. In these examples quantities are indicated as parts by weight. Temperatures are expressed in degrees centigrade (° C.), and pressures are expressed in millimeters of mercury (mm.).

Example 1

A solution of 71 parts of γ-chlorobutyryl chloride and 63 parts of benzene is added with stirring and cooling to a suspension of 71 parts of aluminum chloride in 310 parts of benzene. After the addition is completed, the cooling bath is removed, and the stirring is continued for 30 minutes. The reaction mixture is poured into ice water. The benzene layer is separated, dried over anhydrous sodium sulfate, and filtered. The filtrate is concentrated under reduced pressure to remove the benzene and the residue is distilled to yield γ-cholorbutyrophenone boiling at about 134–137° C. at 5 mm. pressure.

Example 2

To a suspension of 341 parts of aluminum chloride in 1740 parts of carbon disulfide are added 96 parts of fluorobenzene with stirring and cooling. While the temperature is maintained at about 10° C., 141 parts of γ-chlorobutyryl chloride are added. After the addition is completed, the cooling bath is removed and the stirring is continued for 2 hours. The reaction mixture is poured into ice water. The organic layer is separated, washed with water, dried over anhydrous sodium sulfate, and filtered. The filtrate is concentrated under reduced pressure, and the residue is distilled to yield γ-chloro-4-fluorobutyrolphenone boiling at about 136–142° C. at 6 mm. pressure.

Example 3

A mixture of 7.5 parts of γ-chlorobutyrophenone and 13.4 parts of 1-phenylpiperazine is allowed to remain at room temperature for 6 hours. The reaction is then continued by heating the mixture for 4 hours at a temperature of 105–110° C. After cooling to room temperature, 200 parts of ether are added, and the mixture is washed with water. The ethereal solution is dried over anhydrous potassium carbonate, filtered, and evaporated. The residue is taken up in a 4:1 mixture of 70% ethanol and ether. The solution is cooled and the precipitate thus obtained is recovered by filtration and recrystallized first from a 6:5 mixture of 2-propanol and water and then from a 3:2 mixture of 2-propanol and water. The 1-(γ-benzoylpropyl)-4-phenylpiperazine thus obtained melts at about 89–90° C.

Example 4

A mixture of 9.9 parts of δ-chloropentanophenone and 16.2 parts of 1-phenylpiperazine is heated for 10 hours at a temperature of 105–110° C. The mixture is treated with 300 parts of water and 240 parts of ether, and the ether layer is separated. The ether solution is evaporated, and the oily residue is taken up in 320 parts of ether, dried over anhydrous potassium carbonate, and filtered. Dry hydrogen chloride gas is passed through the filtrate, The resulting precipitate is collected on a filter and recrystallized first from a mixture of 200 parts of acetone and 320 parts of methanol and then from a mixture of 100 parts of acetone, 100 parts of 2-propanol, and 80 parts of methanol to yield 1-(δ-benzoylbutyl)-4-phenyl-piperazine dihydrochloride melting at about 209–212° C.

*Example 5*

A mixture of 185 parts of bis(β-ethanol)amine and 177 parts of 1-amino-3-fluorobenzene is added to 280 parts of 12-N hydrochloric acid. After 264 parts of water are evaporated, the remaining solution is rendered alkaline with 336 parts of 44% sodium hydroxide solution. The solution is extracted with chloroform. The organic layer is separated, dried over anhydrous potassium carbonate, filtered, and fractionated to yield 1-(3-fluorophenyl)-piperazine boiling at about 145–155° at 3 mm. pressure.

A mixture of 8.5 parts of γ-chlorobutyrophenone and 17 parts of 1-(3-fluorophenyl)piperazine is heated at 100° C. for 10 hours. The reaction mixture is then boiled with 600 parts of diisopropyl ether, and the precipitate is collected on a filter. The filtrate is washed with water. The ether layer is separated and concentrated to about 80 parts. By cooling this solution to about −15° C., the base crystallizes and is collected on a filter. Upon recrystallization from diisopropyl ether, 1-(γ-benzoylpropyl)-4-(3-fluorophenyl)piperazine melts at about 80.2–81.6° C.

*Example 6*

A mixture of 9.1 parts of γ-chlorobutyrophenone and 19.6 parts of 1-(3-chlorophenyl)piperazine is heated for 10 hours at a temperature of 105–110° C. The mixture is cooled to room temperature and then treated with 500 parts of water and 240 parts of diisopropyl ether. The ether layer is separated, concentrated to about ⅔ of its volume, and treated with activated charcoal. Upon cooling, there precipitates the 1-(γ-benzoylpropyl)-4-(3-chlorophenyl)piperazine which is recovered by filtration and is found to melt at about 88–90° C.

*Example 7*

In an open flask a mixture of 9.1 parts of γ-chlorobutyrophenone and 19.7 parts of 1-(4-chlorophenyl)-piperazine is heated for 10 hours at a temperature of 105–110° C. After the contents of the flask are cooled to room temperature, 160 parts of ether are added and the solution is washed with water. The aqueous layer is separated and extracted with 160 parts of ether. The ethereal solutions are combined, dried over anhydrous potassium carbonate, filtered, and evaporated. The residue is recrystallized from a 10:1 mixture of low-boiling petroleum ether and ethanol. The white crystalline 1-(γ-benzoylpropyl)-4-(4-chlorophenyl)piperazine melts at about 127–128.4° C.

*Example 8*

Substitution of 17.6 parts of 1-(3-tolyl)-piperazine for the 1-(4-chlorophenyl)piperazine in Example 7 yields 1-(γ-benzoylpropyl)-4-(3-methylphenyl)piperazine which is recrystallized first from a 7:1 mixture of ethanol and water and then from a 13:1 mixture of low boiling petroleum ether and ethanol. The compound melts at about 78–79° C.

*Example 9*

Substitution of 17.6 parts of 1-(4-tolyl)-piperazine for the 1-(4-chlorophenyl)piperazine in Example 7 yields 1-(γ-benzoylpropyl)-4-(4-methylphenyl)piperazine which is recrystallized from an equimolar mixture of 2-propanol and water. The compound melts at about 87.5–88.3° C.

*Example 10*

A mixture of 7.46 parts of γ-chlorobutyrophenone and 16.8 parts of 1-(4-methoxyphenyl)piperazine is heated in an open flask for 10 hours at a temperature of 110° C. The reaction mixture is treated with 600 parts of boiling ether. The insoluble residue is filtered off, and the filtrate is allowed to cool to room temperature. The product is collected on a filter and recrystallized from diisopropyl ether to yield 1-(γ-benzoylpropyl)-4-(4-methoxyphenyl)piperazine melting at about 85–86.2° C.

*Example 11*

A mixture of 10 parts of γ-chloro-4-fluorobutyrophenone and 16.2 parts of 1-phenylpiperazine is allowed to stand at room temperature for 72 hours. To the reaction mixture are added 400 parts of ether. The ethereal solution is washed with water, dried over anhydrous potassium carbonate, filtered, and evaporated to dryness. The residue is recrystallized from 2-propanol to yield 1-[γ - (4 - fluorobenzoyl)propyl] - 4 - phenylpiperazine melting at about 104–106° C.

*Example 12*

A mixture of 9.8 parts of δ-chloropentanophenone and 17.6 parts of 1-(3-methylphenyl)piperazine is heated for 10 hours at a temperature of 110° C. Upon cooling, 600 parts of ether are added, and the mixture is washed with water. The aqueous layer is separated and extracted with ether. The combined ether layer is evaporated. The oil is taken up in 2-propanol, whereupon dry, gaseous hydrogen chloride is introduced into the solution. The hydrochloride is collected on a filter and recrystallized from a mixture of 2-propanol and methanol to yield 1-(δ-benzoylbutyl) - 4 - (3-methylphenyl)piperazine dihydrochloride melting at about 191.5–192.5° C.

*Example 13*

Substitution of 10 parts of γ-chloro-4-fluorobutyrophenone for the γ-chlorobutyrophenone in Example 7 yields 1-[γ-(4-fluorobenzoyl)propyl]-4-(4-chlorophenyl)-piperazine which is recrystallized first from ethanol and then from a 40:3 mixture of low boiling petroleum ether and ethanol. The white crystals melt at about 96–98° C.

*Example 14*

A mixture of 13.3 parts of γ-chloro-4-fluorobutyrophenone and 17.6 parts of 1-(4-methylphenyl)piperazine is heated in an open flask for 10 hours at a temperature of 105–110° C. After cooling to room temperature, the solid reaction mixture is treated with 2000 parts of water and 400 parts of ether. The ether solution is dried over anhydrous potassium carbonate and then evaporated. The residue is recrystallized from a mixture of equal parts of 2-propanol and water to yield 1-[γ-(4-fluorobenzoyl)-propyl]-4-(4-methylphenyl)piperazine melting at about 99–101° C.

*Example 15*

A mixture of 6.6 parts of γ-chloro-4-fluorobutyrophenone and 12.5 parts of 1-(2-methoxyphenyl)piperazine is heated for 10 hours at a temperature of 110° C. The reaction mixture is treated with 800 parts of ether and filtered. The ether layer is washed with water, dried over anhydrous potassium carbonate and filtered, whereupon hydrogen chloride gas is introduced into the solution. The precipitate is collected on a filter and dissolved in a mixture of 240 parts of 2-propanol and 80 parts of acetone to yield 1-[γ-(4-fluorobenzoyl)propyl]-4-(2-methoxyphenyl)piperazine hydrochloride. This monohydrochloride is collected on a filter and dissolved in 240 parts of 2-propanol. Anhydrous, gaseous hydrogen chloride is passed through the solution. On cooling, the 1-[γ-(4-fluorobenzoyl)propyl]-4-(2 - methoxyphenyl)piperazine dihydrochloride precipitates.

A second crop of product is obtained by passing hydrogen chloride gas through the solution of mother liquors. The pale-brown, amorphous powder is collected on a filter and found to melt at about 205–205.5° C.

This salt is dissolved in water and treated with sodium hydroxide. The precipitated base is recovered by filtration and recrystallized from diisopropyl ether. The white crystals melt at about 67.5–68.5° C.

Example 16

Substitution of an equimolar amount of chlorobenzene for the fluorobenzene in Example 2 yields γ,4-dichlorobutyrophenone boiling at about 185–190° C., at 12 mm. pressure.

A mixture of 10.8 parts of γ,4-dichlorobutyrophenone and 16.2 parts of 1-phenylpiperazine is heated for 7 hours at a temperature of 160° C. After cooling, the mixture is taken up in 600 parts of ether. The ether layer is extracted with water, separated, dried over anhydrous potassium carbonate, filtered, and evaporated. The residue is recrystallized from a mixture of acetone and methanol to yield 1-[γ-(4-chlorobenzoyl)propyl]-4-phenylpiperazine melting at about 113.5–114.4° C.

Example 17

A mixture of 10.8 parts of γ,4-dichlorobutyrophenone and 19.6 parts of 1-(3-chlorophenyl)piperazine is heated for 10 hours at a temperature of 100° C. The mixture is boiled with 800 parts of ether and the filtered. The filtrate is washed with water, dried over anhydrous potassium carbonate, filtered, and evaporated until a solid separates. The solution is cooled and the precipitate is recovered by filtration. The 1-[γ-(4-chlorobenzoyl)propyl]-4-(3-chlorophenyl)piperazine is recrystallized from diisopropyl ether and is found to melt at about 86–88° C.

Substitution of 16.8 parts of 1-(4-methoxyphenyl)-piperazine for the chlorophenylpiperazine yields 1-[γ-(4-chlorobenzoyl)propyl]-4-(4-anisyl)piperazine which, recrystallized from diisopropyl ether, melts at about 126.6–127.8° C.

Example 18

Substitution of an equimolar amount of toluene for the fluorobenzene in Example 2 yields γ-chloro-4-methyl-butyrophenone melting at 31.5° C.

A mixture of 8 parts of γ-chloro-4-methylbutyrophenone and 14 parts of 1-phenylpiperazine is maintained at about 105° C. for 5 hours. To the reaction mixture are added 800 parts of ether and 500 parts of water. The organic layer is separated, dried over anhydrous potassium carbonate, filtered, and evaporated. The residue is recrystallized from a 10:7 mixture of low boiling petroleum ether and ethanol to yield 1-[γ-(4-methylbenzoyl)-propyl]-4-phenylpiperazine melting at about 103–104.8° C.

Example 19

A mixture of 9.8 parts of γ-chloro-4-methyl-butyrophenone and 19.6 parts of 1-(4-methylphenyl)-piperazine is heated in an open flask for 8 hours at a temperature of 100° C. After the contents of the flask are cooled to room temperature, 600 parts of ether are added, and the solution is washed with water. The organic layer is separated, dried over anhydrous potassium carbonate, and evaporated. The residue is first recrystallized from a mixture of equal parts of water and 2-propanol and then from a boiling mixture of water and 2-propanol to which is added activated charcoal. The solution is filtered and then cooled to about 0° C., to yield impure 1-[γ-(4-methylbenzoyl)propyl]-4-(4-methylphenyl)piperazine which recrystallized from a mixture of methanol and acetone. The amorphous powder of this compound melts at about 117.2–119.2° C.

Example 20

In an open flask a mixture of 8.04 parts of γ-chloro-4-methylbutyrophenone and 16.8 parts of 1-(4-methoxyphenyl)piperazine is heated for 10 hours at a temperature of 110° C. The solid reaction product is boiled with 800 parts of diisopropyl ether. The residue is filtered off and the solution is cooled. The 1-[γ-(4-methylbenzoyl)propyl]-4-(4-methoxyphenyl)piperazine thus obtained is collected on a filter and recrystallized from diisopropyl ether to yield white plates melting at about 123.2–124° C.

By substituting 17.6 parts of 1-(3-methylphenyl)-piperazine for 16.8 parts of 1-(4-methoxyphenyl)piperazine and 12 parts of γ,4-dichlorobutyrophenone for 8.04 parts of γ-chloro-4-methylbutyrophenone in the first paragraph of this example, 1-[γ-(4-chlorobenzoyl)propyl]-4-(3-methylphenyl)piperazine melting at about 99.6–100.4° C. is obtained.

Example 21

Substitution of an equimolar amount of anisole for the fluorobenzene in Example 2 yields γ-chloro-4-methoxybutyrophenone boiling at about 175° C. at 6 mm. pressure.

In a sealed reactor a mixture of 10.6 parts of γ-chloro-4-methoxybutyrophenone, 16.2 parts of 1-phenylpiperazine, and 0.1 part of potassium iodide in 120 parts of dry toluene is heated for 72 hours at a temperature of 145–150° C. The reaction mixture is cooled to room temperature and then filtered. Upon cooling the filtrate, there precipitates the product which is collected on a filter and recrystallized from diisopropyl ether to yield 1-[γ-(4-methoxybenzoyl)propyl]-4-phenylpiperazine melting at about 126.6–127.5° C.

Example 22

A mixture of 11 parts of γ-chloro-4-methoxybutyrophenone and 19.6 parts of 1-(2-chlorophenyl)-piperazine is heated in an open flask for 10 hours at a temperature of 110° C. Then 600 parts of boiling ether are added to the reaction mixture and the insoluble material filtered off. Upon cooling the precipitate formed is filtered and recrystallized from diisopropyl ether to yield 1-[γ-(4-methoxybenzoyl)propyl]-4-(2-chlorophenyl)piperazine melting at about 73.5–73.8° C.

Example 23

Substitution of 19.7 parts of 1-(4-chlorophenyl)-piperazine for the 1-(3-chlorophenyl)piperazine in Example 22 yields 1-[γ-(4-methoxybenzoyl)propyl]-4-(4-chlorophenyl)piperazine which is recrystallized from 2-propanol. The white crystals melt at about 128.6–130° C.

Example 24

Substitution of 11 parts of γ-chloro-4-methoxybutyrophenone for the γ-chlorobutyrophenone and substitution of 1-(3-methylphenyl)piperazine for the 1-(4-chlorophenyl)-piperazine in Example 7 yields 1-[γ-(4-methoxybenzoyl)-propyl]-4-(3-methylphenyl)piperazine which is recrystallized first from a 7:3 mixture of ethanol and water in the presence of activated charcoal and then from an equimolar mixture of 2-propanol and watered. The white crystals melt at about 105–106° C.

Example 25

Substitution of 17.6 parts of 1-(4-methylphenyl)-piperazine for the 1-(3-chlorophenyl)piperazine in Example 22 yields 1-[γ-(4-methoxybenzoyl)propyl]-4-(4-methylphenyl)-piperazine which, upon recrystallization from a 2:1 mixture of 2-propanol and water, is found to melt at about 126.6–127.6° C.

Example 26

Substitution of an equimolar amount of phenetole for the fluorobenzene in Example 2 yields γ-chloro-4-ethoxybutyrophenone.

Substitution of 11.4 parts of γ-chloro-4-ethoxybutyrophenone for the γ-chloro-4-methoxybutyrophenone and substitution of 16.2 parts of 1-phenylpiperazine for the 1-(3-chlorophenyl)piperazine used in Example 22 yields 1-[γ-(4-ethoxybenzoyl)propyl]-4-phenylpiperazine which is recrystallized from diisopropyl ether and found to melt at about 125.2–126.8° C.

Example 27

A mixture of 10.8 parts of γ,4-dichlorobutyrophenone and 19.6 parts of 1-(4-chlorophenyl)piperazine is heated for 10 hours at the temperature of 100–105° C. The mixture is extracted with 1200 parts of ether and filtered. The filtrate is washed with water, dried over anhydrous potassium carbonate, filtered, and evaporated in vacuo. The residue is recrystallized from a mixture of diisopropyl ether and acetone to yield 1-[γ-(4-chlorobenzoyl)propyl]-4-(4-chlorophenyl)piperazine melting at about 127–128.5° C.

Example 28

A mixture of 10.8 parts of γ,4-dichlorobutyrophenone and 17.6 parts of 1-(4-methylphenyl)piperazine is boiled in 600 parts of ether for 10 hours and then filtered. The filtrate is washed with 500 parts of water, dried, and evaporated to about 200 parts. The solid precipitate obtained by evaporation is collected on a filter and dried to yield the first crop of the pale yellow crystalline powder of 1-[γ-(4-chlorobenzoyl)propyl]-4-(4-methylphenyl)piperazine melting at about 125.6–127° C. By further evaporation of the mother liquor to 100 parts and chilling at 0° C. for 15 hours, a second precipitate is obtained which is recrystallized from ether at −15° C. to yield the second crop of the product melting at about 129.5–130.5° C.

Example 29

After heating 10 parts of γ-chloro-4-fluoro-butyrophenone and 19.6 parts of 1-(3-chlorophenyl)piperazine at 100° C. for 10 hours, the mixture is boiled with 800 parts of ether and filtered. The filtrate is washed with 500 parts of water, dried over potassium carbonate, filtered, and the filtrate evaporated to about 100 parts to induce precipitation. After cooling at 0° C. for 8 hours, the precipitate is filtered and dissolved in ether. After cooling for 8 hours at −15° C. a precipitate is filtered, and dried to yield the pale yellow granular powder of 1-[γ-4 - fluorobenzoyl)propyl]-4-(-3-chlorophenyl)piperazine melting at about 86.4–88° C. Upon further evaporation of the mother liquor, extraction with diisopropyl ether, and chilling to −20° C. a second crop of the product is obtained which melts at about 87–88° C.

Example 30

Substitution of 18.6 parts of 1-(4-fluorophenyl)-piperazine for the 1-(3-chlorophenyl)piperazine in Example 22 yields 1- γ-(4-methoxybenzoyl)propyl]-4-(4-fluorophenyl)piperazine as a white amorphous powder melting at 121.2–121–8° C.

Example 31

Substitution of 16.8 parts of 1-(4-methoxyphenyl)piperazine for the 1-(3-chlorophenyl)piperazine in Example 17 yields 1-[γ-(4-chlorobenzoyl)propyl]-4-(4-methoxyphenyl)piperazine which is recrystallized from diisopropyl ether. The crystals melt at about 126.6–127.8° C.

Example 32

In an open flask a mixture of 9.8 parts of γ-chloro-4-methylbutyrophenone and 19.6 parts of 1-(4-chlorophenyl)piperazine is heated for 10 hours at a temperature of 110° C. The mixture is extracted with a 2:3 mixture of ether and water, and the ether layer is separated, dried over anhydrous potassium carbonate, filtered, and evaporated. The residue is recrystallized from a 3:2 mixture of 2-propanol and water to yield 1-[γ-(4-methylbenzoyl)propyl]-4-(4-chlorophenyl)piperazine melting at about 134.5–136° C.

Example 33

To 8.5 parts of 1-(γ-benzoylpropyl)-4-phenylpiperazine dissolved in 160 parts of absolute ethanol is added 0.25 part of sodium borohydride portionwise and with stirring. The stirring is continued for 2 hours at 45° C. The mixture is then decomposed with 2-N hydrochloric acid. The solvent is removed by distillation. The residue is dissolved in water, and made alkaline with 5% sodium hydroxide. The water layer is extracted with ether. After drying over sodium carbonate and filtering, hydrogen chloride gas is passed through the solution. The dihydrochloride which is precipitated is collected and dissolved in a mixture of acetone, 2-propanol, and methanol from which it is recrystallized by chilling at −15° C. The 1-phenyl-4-(4-phenylpiperazine)-1-butanol dihydrochloride melts at about 198–200° C. It has the structural formula

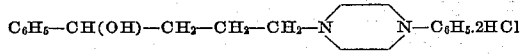

Example 34

After dissolving 5 parts of 1-(δ-benzoylbutyl)-4-phenylpiperazine dihydrochloride in 1,000 parts of water the solution is made alkaline and extracted with 400 parts of ether. The ether layer is dried over calcium chloride, filtered, and evaporated. The residue is dissolved in 120 parts of 2-propanol and 40 parts of absolute ethanol at 35–40° C. At this temperature 0.2 part of sodium borohydride is added and the stirring is continued for 2 hours. The mixture is decomposed with 80 parts of 2-N hydrochloric acid added portionwise, made alkaline with 80 parts of 5% sodium hydroxide, and diluted to a total volume of 1,000 parts. After cooling for 32 hours at 0° C., the precipitate formed is filtered, dried and dissolved in a mixture of acetone and water. By cooling to −15° C. a precipitate forms which is removed by filtration. The filtrate is concentrated whereupon a precipitate forms. This is collected and dried to yield the white amorphous powder of 1-phenyl-5-(4-phenylpiperazine)-1-pentanol melting at about 111–112° C.

Example 35

To 3.9 parts of 1-(γ-benzoylpropyl)-4-(3-methylphenyl)piperazine in 120 parts of absolute ethanol is added with stirring 0.3 part of sodium borohydride. The stirring is continued for 210 minutes at 35–40° C. After cooling to room temperature the mixture is decomposed with 80 parts of 2-N hydrochloric acid. The mixture is filtered and the filtrate is cautiously made alkaline with 20% sodium hydroxide. After allowing the mixture to stand for 3 hours at 0° C., the precipitate is filtered and washed with diisopropyl ether. A second crop precipitates on standing at −20° C. The combined precipitates are disolved in diisopropyl ether and filtered. The filtrate is cooled to 0° C. and the precipitated solid is filtered and dried to yield the white shiny crystals of 1-phenyl-4-[4-(3-methylphenyl)piperazine]-1-butanol melting at about 83.5–84.5° C.

Example 36

To 5.2 parts of 1-(γ-benzoylpropyl)-4-(4-methylphenyl)piperazine in 120 parts of absolute ethanol is added portionwise and with stirring 0.04 part of sodium borohydride. The stirring is continued for 2 hours at 35° C. Upon cooling to 20° C. the mixture is decomposed with 40 parts of 2-N hydrochloric acid, diluted with 300 parts of water, made alkaline with sodium hydroxide and diluted again with 500 parts of water. The mixture is allowed to remain at 0° C. for 8 hours after which the precipitate is removed by filtration and dissolved in boiling diisopropyl ether. After chilling for 8 hours at −20° C. the precipitate is collected and dried under vacuum to yield the white granular powder of 1 - phenyl-4-[4-(4-methylphenyl)piperazine] - 1 - butanol melting at about 90.2–91.8° C.

Example 37

A mixture of 5 parts of 1-(δ-benzoylbutyl)-4-(3-methylphenyl)piperazine dihydrochloride in 800 parts of water, is made alkaline and extracted with 400 parts of ether. The ether layer is dried over calcium chloride, filtered, and evaporated to yield the free base of 1-(δ-benzoylbutyl)-4-(3-methylphenyl)piperazine which is dissolved in 120 parts of 2-propanol and 40 parts of absolute ethanol at 35–40° C. While maintaining this temperature, 0.2 part of sodium borohydride is added. Stirring is continued for 2 hours. The mixture is then decomposed with 80 parts of 2-N hydrochloric acid added portionwise, made basic with 80 parts of 5% sodium hydroxide, and diluted to a total volume of 1,000 parts. After cooling for 32 hours, the precipitate is filtered and dried to yield the white microcrystalline powder of 1-phenyl-5-[4-(3-methylphenyl)piperazine]-1-pentanol melting at 107.4–109.2° C. It has the structural formula

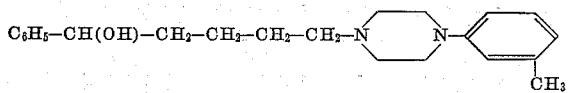

*Example 38*

To a mixture of 3 parts of 1-(γ-benzoylpropyl)-4-(3-fluorophenyl)piperazine and 110 parts of absolute ethanol is added portionwise with stirring 0.2 part of sodium borohydride. The stirring is continued for 2 hours after which the mixture is decomposed with 80 parts of 2-N hydrochloric acid. After diluting with water, making alkaline with sodium hydroxide, and further diluting with water to a total volume of 600 parts, the mixture is chilled for 2 hours. The precipitate is filtered, dissolved in diisopropyl ether, and chilled at −15° C. for 72 hours to yield the amorphous powder of 1-phenyl-4-[4-(3-fluorophenyl)piperazine]-1-butanol melting at about 70–71.5° C. It has the structural formula

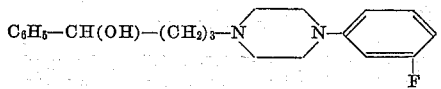

*Example 39*

After dissolving 5 parts of 1-(γ-benzoylpropyl)-4-(3-chlorophenyl)piperazine in 200 parts of absolute ethanol at 60° C., the mixture is cooled to 40° C. and 0.3 part of sodium borohydride is added portionwise. The mixture is further cooled at 25° C. and decomposed with 180 parts of 2-N hydrochloric acid. After diluting with 500 parts of water, the mixture is made alkaline with 50% sodium hydroxide. Upon chilling a precipitate is formed which is filtered and washed with diisopropyl ether and dried under vacuum to yield the white amorphous powder of 1 - phenyl-4-[4-(3-chlorophenyl)piperazine]-1-butanol melting at about 99–99.9° C.

*Example 40*

To 3.4 parts of 1-(γ-benzoylpropyl)-4-(4-chlorophenyl)piperazine in 90 parts of absolute ethanol is added 0.03 part of sodium borohydride portionwise. The mixture is allowed to remain at about 40° C. for 4 hours and then diluted with 50 parts of ethanol, cooled to 25° C., and decomposed by the addition of 60 parts of 2-N hydrochloric acid. After filtration, the filtrate is made alkaline and cooled to 0° C. for 3 hours. The precipitate formed is filtered and recrystallized from a mixture of diisopropyl ether and acetone to yield 1-phenyl-4-[4-(4-chlorophenyl)piperazine]-1-butanol melting at about 105–106° C. By further cooling of the liquor to −15° C. for 12 hours, more of the above product can be obtained.

*Example 41*

After dissolving 3.5 parts of 1-(γ-benzoylpropyl)-4-(4-methoxyphenyl)piperazine in 240 parts of absolute ethanol at about 35–40° C. is added 0.03 part of sodium borohydride portionwise. The mixture is allowed to stand for 2 hours at this temperature and then cooled further to 20° C. After decomposition with 160 parts of 2-N hydrochloric acid and dilution with 900 parts of water, the mixture is made alkaline with sodium hydroxide and further diluted. The mixture is allowed to stand for 3 hours and the precipitate is filtered and dissolved in diisopropyl ether. After cooling to −20° C. for 4 hours, the precipitate is collected by filtration and dried to yield the white crystalline needles of 1-phenyl-4-[4-(4-methoxyphenyl)piperazine]-1-butanol melting at about 91.5–92.6° C.

*Example 42*

After dissolving 4.5 parts of 1-[γ-(4-methylbenzoyl)propyl]-4-phenylpiperazine in 130 parts of absolute ethanol at 55° C., 0.03 part of sodium borohydride is added portionwise at 40° C. The mixture is allowed to stand for 2 hours at room temperature after which the solvent is evaporated to a volume of 50 parts, decomposed with 120 parts of 2-N hydrochloric acid, diluted with 800 parts of water, and made alkaline with 50% sodium hydroxide. After cooling to 0° C., the precipitate is filtered, washed with diisopropyl ether, and dried under vacuum at 50° C. to yield the white granular powder of 1 - (4-methylphenyl)-4-(4-phenylpiperazine) - 1 - butanol melting at about 104.8–105.6° C.

*Example 43*

After dissolving 5 parts of 1-[γ-(2,5-dimethylbenzoyl)propyl]-4-phenylpiperazine hydrochloride in 1,000 parts of water, the solution is made alkaline with 5% sodium hydroxide, and extracted with 400 parts of ether. The ethereal layer is dried over calcium carbonate, filtered, and evaporated. The residue is dissolved in 120 parts of absolute ethanol and 0.15 part of sodium borohydride is added portionwise at 35° C. The stirring is continued for 3 hours. The mixture is decomposed with 160 parts of 2-N hydrochloric acid and made alkaline with 5% sodium hydroxide. The solid which precipitates is collected by filtration. This solid is dissolved in a mixture of acetone and water and chilled at 0° C. for 8 hours. The precipitate formed is filtered and dried to yield the white flaky crystals of 1-(2,5-dimethylphenyl)-4-(4-phenylpiperazine)-1-butanol melting at about 92.8–93.8° C.

*Example 44*

After dissolving 3.3 parts of 1-[γ-(4-methylbenzoyl)propyl]-4-(4-methylphenyl)piperazine in 160 parts of absolute ethanol, 0.03 part of sodium borohydride is added portionwise at 45° C. The mixture is then allowed to stand at room temperature for 10 hours. After concentrating to a volume of 50 parts, the mixture is decomposed with 80 parts of 2-N hydrochloric acid, diluted with 600 parts of water, and made alkaline with 50% sodium hydroxide. By chilling to 0° C. a precipitate is formed which is collected by filtration, washed with diisopropyl ether, and dried under vacuum at 50° C. to yield the white amorphous powder of 1-(4-methylphenyl)-4-[-(4-methylphenyl)piperazine]-1-butanol melting at about 105–106° C.

*Example 45*

To a solution of 3.5 parts of 1-[γ-(4-methylbenzoyl)propyl]-4-(4-methoxyphenyl)piperazine in 200 parts of absolute ethanol and 400 parts of 2-propanol, is added 0.12 part of sodium borohydride at 35–40° C. with stirring. The stirring is continued for 2 hours after which the mixture is decomposed by 120 parts of 2-N hydrochloric acid and then made basic. After dilution to a volume of 3500 parts, the mixture is allowed to remain standing at room temperature for 8 hours. The precipitate formed is filtered and dried to yield the crude 1-(4-methylphenyl)-4-[4-(4-methoxyphenyl)piperazine] - 1 - butanol. This crude product is dissolved in acetone, filtered, and the solution is diluted with water. After chilling at −15° C., filtering, and drying the pure white amorphous powder melting at about 84–85° C., is obtained. It has the structural formula

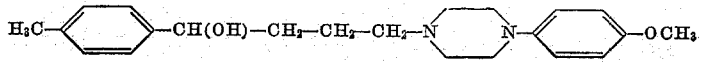

Example 46

By heating at 55° C. 3 parts of 1-[γ-(4-fluorobenzoyl)propyl]-4-phenylpiperazine is dissolved in 80 parts of absolute ethanol. After slowly cooling to 32° C., 0.2 part of sodium borohydride is added portionwise with stirring. The stirring is continued for 3 hours at 35° C. The mixture is decomposed with 80 parts of 2-N hydrochloric acid at 20° C. After the addition of 100 parts of water, the mixture is made basic with 5% sodium hydroxide and then diluted to a total volume of 1,000 parts. The mixture is allowed to stand at 0° C. for 8 hours and the precipitate is filtered and dissolved in acetone and water. This mixture is allowed to remain standing at 0° C. and the precipitate formed is filtered and dried to yield the white amorphous powder of 1-(4-fluorophenyl)-4-(4-phenylpiperazine)-1-butanol melting at about 85.5–87.5° C. It forms a hydrochloride melting at about 143.5–146.5° C.

Example 47

While maintaining a temperature of 35° C., 4.2 parts of 1-[γ-(4-chlorobenzoyl)propyl]-4-phenylpiperazine are dissolved in 200 parts of absolute ethanol and 0.12 part of sodium borohydride is added portionwise to the solution. The mixture is stirred for 2 hours at 35° C. and then decomposed with 60 parts of 2-N hydrochloric acid. The solvent is evaporated to leave a solid residue which is dissolved in 500 parts of water. The solution is made alkaline with 80 parts of 5% sodium hydroxide, extracted with ether, and the ethereal solution is dried over potassium carbonate and filtered. After concentrating to a small volume and cooling to 0° C., 1-(4-chlorophenyl)-4-(4-phenylpiperazine)-1-butanol is precipitated. After filtering and drying, the pale gray amorphous powder of this compound melts at about 93.5–95° C.

Example 48

To 80 parts of ethanol are added 3 parts of 1-[γ-(4-fluorobenzoyl)propyl]-4-(3-chlorophenyl)-piperazine at 50° C. The solution is then cooled to 35° C. and 0.2 part of sodium borohydride is added portionwise with stirring. The mixture is allowed to stand at the same temperature for 210 minutes after which it is cooled on a water bath to 25° C. After decomposition by the portionwise addition of 80 parts of 2-N hydrochloric acid the mixture is diluted with 200 parts of water, made alkaline with 20% sodium hydroxide, and further diluted to a total volume of about 1,000 parts. After chilling at 0° C. for about one hour, the precipitate formed is filtered and dried. This solid is dissolved in acetone, filtered, and the filtrate chilled to 0° C. for 36 hours. The precipitate which is formed is filtered and dried to yield 1-(4-fluorophenyl)-4-[4-(3-chlorophenyl)-piperazine]-1-butanol melting at about 100–101.8° C. It has the structural formula

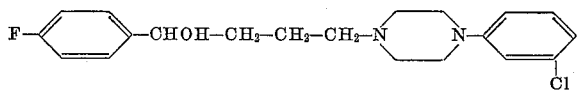

Example 49

To 3.6 parts of 1-[γ-(4-fluorobenzoyl)propyl]-4-(4-chlorophenyl)piperazine in 160 parts of absolute ethanol is added 0.3 part of sodium borohydride portionwise. The mixture is stirred for 4 hours at 40° C. and then decomposed by the addition of 70 parts of 2-N hydrochloric acid. The solution is made alkaline and diluted with water to a total volume of about 600 parts. The product which precipitates is collected and recrystallized from diisopropyl ether to yield 1-(4-fluorophenyl)-4-[4-(4-chlorophenyl)piperazine]-1-butanol melting at about 112.5–113.8° C.

Example 50

To a solution of 3 parts of 1-[γ-(4-chlorobenzoyl)-propyl]-4-(3-chlorophenyl)piperazine in 80 parts of absolute ethanol, 0.3 part of sodium borohydride is added portionwise and with stirring at 35° C. The stirring is continued for 150 minutes and the mixture is cooled to 15° C. on a water bath. After decomposition with 80 parts of 2-N hydrochloric acid, the mxiture is made alkaline with 20% sodium hydroxide and diluted to a total volume of 1,000 parts. After standing at −15° C. a precipitate forms which is collected by filtration and dissolved in diisopropyl ether. After concentrating to a volume of about 40 parts and cooling to 0° C. for 8 hours, the precipitate formed is filtered and dried to yield the powder of 1-(4-chlorophenyl)-4-[4-(3-chlorophenyl)-piperazine]-1-butanol melting at about 84–85° C.

Example 51

To a stirred solution of 4.6 parts of 1-[γ-(4-chlorobenzoyl)propyl]-4-(4-chlorophenyl)piperazine in 200 parts of absolute ethanol, is added 0.3 part of sodium borohydride. The stirring is continued for 210 minutes after which the mixture is evaporated under vacuum to about 100 parts. After decomposition with 80 parts of 2-N hydrochloric acid and filtration, the mixture is made alkaline with 20% sodium hydroxide and is allowed to remain standing at 0° C. for 3 hours. The precipitate is filtered, washed with diisopropyl ether, dried, and dissolved in diisopropyl ether and acetone. The mixture is filtered and the filtrate is chilled at 0° C. The precipitate formed is collected, washed, and dried to yield the microcrystalline powder of 1-(4-chlorophenyl)-4-[4-(4-chlorophenyl)piperazine]-1-butanol melting at about 132–133° C.

Example 52

By dissolving 4 parts of 1-[γ-(4-fluorobenzoyl)propyl]-4-(2-methoxyphenyl)piperazine dihydrochloride in 800 parts of water, rendering alkaline, extracting with 400 parts of ether, drying over calcium chloride, filtering, and evaporating the resulting solution the free base of 1-[γ-(4 - fluorobenzoyl)propyl] - 4 - (2 - methoxyphenyl) - piperazine is obtained. This product is dissolved in 120 parts of absolute ethanol and 0.03 part of sodium borohydride is added portionwise at 35° C. After decomposition with 150 parts of 1-N hydrochloric acid, the mixture is diluted with 500 parts of water, made alkaline with 4-N sodium hydroxide, and further diluted to a volume of 1,000 parts. Upon cooling for 4 hours at 0° C. the precipitate formed is filtered, dried, and recrystallized from diisopropyl ether to yield 1-(4-fluorophenyl)-4-[4-(2 - methoxyphenyl)piperazine] - 1 - butanol. The white granular powder of this compound has a melting point of about 105–106° C.

Equimolar substitution of 1[γ-(4-chlorobenzoyl)-propyl]-4-(2-methoxyphenyl)piperazine dihydrochloride for 1-[γ-(4-fluorobenzyl)propyl]-4-(2-methoxyphenyl)-piperazine dihydrochloride yields 1-(4-chlorophenyl)-4-[4-(2-methoxyphenyl)piperazine]-1-butanol.

Example 53

To a solution of 4 parts of 1-[γ-(4-chlorobenzoyl)-propyl]-4-(3-methylphenyl)piperazine in 160 parts of absolute ethanol is added 0.04 part of sodium borohydride portionwise at 37° C. Stirring is continued for 2 hours. The mixture is then decomposed at 20° C. with 400 parts of 2-N hydrochloric acid, rendered alkaline, and diluted with 300 parts of water. After chilling at 0° C. for 8 hours, the precipitate is filtered and dissolved in diisopropyl ether. A precipitate forms at −20° C. and is filtered and dried to yield the white amorphous powder of 1 - (4 - chlorophenyl) - 4 - [4 - (3 - methylphenyl) - piperazine]-1-butanol melting at about 93–94.5° C.

Example 54

To a solution of 2.7 parts of 1-[γ-(4-chlorobenzoyl)-propyl]-4-(4-methylphenyl)piperazine in 200 parts of absolute ethanol at 50° C. is added 0.3 part of sodium borohydride portionwise with stirring at 35° C. The stirring is continued for 2 hours. The mixture is decomposed by the portionwise addition of 2-N hydrochloric acid. After dilution with 200 parts of water, the mixture is made alkaline with 20% sodium hydroxide and further diluted to a total volume of 1,000 parts. After chilling at 0° C. for 8 hours, the precipitate formed is filtered and recrystallized from diisopropyl ether at 0° C. After filtering and drying, the white microcrystalline powder of 1-(4-chlorophenyl) - 4 - [4 - (4 - mehylphenyl)piperazine] - 1 - butanol melts at about 116–117° C.

*Example 55*

To a solution of 5.1 parts of 1-[γ-(4-fluorobenzoyl)-propyl]-4-(4-methylphenyl)piperazine in 180 parts of absolute ethanol is added 0.17 part of sodium borohydride portionwise and with stirring. The temperature of 45° C. is maintained while the stirring is continued for 2 hours. The mixture is decomposed with 60 parts of 2-N hydrochloric acid and the solvent is removed by distillation. The remaining residue is dissolved in water. The mixture is made alkaline with 5% sodium hydroxide and extracted with ether. The ethereal solution is dried over potassium carbonate and filtered. The mixture is concentrated to yield a precipitate. Upon drying under vacuum, the needles of 1-(4-fluorophenyl)-4-[4-(4-methylphenyl)piperazine]-1-butanol melts at about 93–95° C.

Substituting 4 parts of 1-[γ-(4-methoxybenzoyl)propyl]-4-phenylpiperazine in 120 parts of ethanol and 0.2 part of sodium borohydride in the above procedure yields the white microcrystalline powder of 1-(4-methoxyphenyl) - 4 - (4 - phenylpiperazine)-1-butanol melting at about 104.2–107.2° C.

Reacting 5 parts of 1-[γ-(4-methoxybenzoyl)-propyl]-4-(4-chlorophenyl)piperazine in 160 parts of ethanol with 0.3 part of sodium borohydride, and work up as above followed by recrystallization of the product from diisopropyl ether, yields the white flaky amorphous powder of 1-(4-methoxyphenyl)-4-[4-(4-chlorophenyl)-piperazine]-1-butanol melting at about 121–122° C. By an analogous manner, 1 - (4 - methoxyphenyl) - 4 - [4-(4-fluorophenyl)piperazine]-1-butanol is made. It has the structural formula

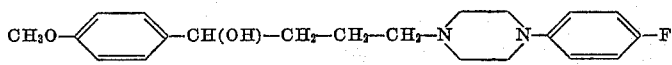

*Example 56*

To a solution of 2 parts of 1 - [γ - (4 - methoxybenzoyl)propyl]-4-(2-chlorophenyl)piperazine in 80 parts of ethanol, 0.2 part of sodium borohydride is added portionwise at 30° C. The mixture is then stirred for 4 hours at 25–30° C. After decomposition with 80 parts of 2-N hydrochloric acid the mixture is diluted with 200 parts of water, made alkaline with 20% sodium hydroxide, and diluted again to a volume of 1,000 parts. After cooling to 0° C. for 2 hours, the mixture is filtered. The precipitate is dissolved in acetone and the mixture is filtered again and the solvent is evaporated to a volume of 100 parts. After cooling for 8 hours at −15° C. the precipitate is collected by filtration and dried to yield the white shiny crystals of 1-(4-methoxyphenyl)-4-[4-(2-chlorophenyl)piperazine]-1-butanol melting at about 106.8–108.4° C.

*Example 57*

To a stirred solution of 4 parts of 1-[γ-(4-methoxybenzoyl)propyl]-4-(3-methylphenyl)piperazine in 120 parts of absolute ethanol, 0.04 part of sodium borohydride is added portionwise at 35° C. The mixture is allowed to stand for 2 hours at 30° C. and concentrated under vacuum to a total volume of 80 parts. After decomposition at 20° C. with 40 parts of 2-N hydrochloric acid and dilution with 600 parts of water, the mixture is made alkaline with 50% sodium hydroxide. The mixture is allowed to stand for 8 hours at 0° C. The precipitate formed is filtered and recrystallized from diisopropyl ether at 0° C. After filtration and drying under vacuum the white crystals of 1-(4-methoxyphenyl)-4-[4-(3-methylphenyl)piperazine]-1-butanol melt at about 119.5–121.5° C.

*Example 58*

To an agitated solution of 4 parts of 1-[γ-(4-methoxybenzoyl)propyl]-4-(4-methylphenyl)piperazine in 200 parts of absolute ethanol is added 0.2 part of sodium borohydride portionwise with stirring. The stirring is continued for 2 hours at 35° C. The mixture is decomposed with 160 parts of 2-N hydrochloric acid, made alkaline, diluted with 700 parts of water, and allowed to remain standing for 2 hours at 0° C. The precipitate formed is filtered and dissolved in a mixture of ether and acetone from which it is recrystallized by chilling to −15° C. The crystals are collected, dried under vacuum, and further recrystallized from ether and acetone at −15° C. to yield 1 - (4 - methoxyphenyl) - 4 - [4 - (4 - methylphenyl)piperazine]-1-butanol. The white crystals of this compound melt at about 109.5–110.2° C. It has the structural formula

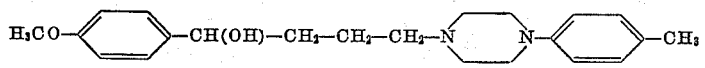

*Example 59*

To a stirred solution of 4 parts of 1-[γ-(4-ethoxybenzoyl)propyl]-4-phenylpiperazine in 320 parts of absolute ethanol is added 0.03 part of sodium borohydride portionwise at 35° C. The stirring is continued for 2 hours. The mixture is decomposed with 160 parts of 1-N hydrochloric acid, diluted with 500 parts of water, made alkaline with 4-N sodium hydroxide and further diluted to a volume of 1,000 parts. After chilling for 4 hours at 0° C., the precipitate formed is filtered, dried, and recrystallized from diisopropyl ether to yield the white needle-like crystals of 1-(4-ethoxyphenyl)-4-(4-phenylpiperazine)-1-butanol melting at about 113–114.8° C.

What is claimed is:

1. A compound of the structural formula

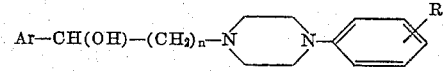

wherein Ar is a member of the class consisting of phenyl, halophenyl, methylphenyl, dimethylphenyl, methoxyphenyl, and ethoxyphenyl; R is a member of the class consisting of hydrogen, methyl, methoxy, and halogen; and *n* an integer greater than two and smaller than five.

2. A compound of the structural formula

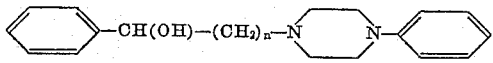

wherein *n* is an integer greater than two and smaller than five.

3. 1-phenyl-5-(4-phenylpiperazine)pentanol.

4. A compound of the structural formula

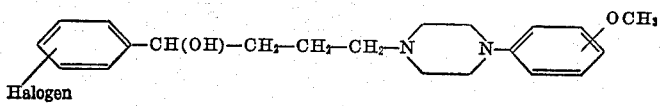

5. 1 - (4-fluorophenyl)-4-[4-(2-methoxyphenyl)piperazine]butanol.
8. A compound of the structural formula
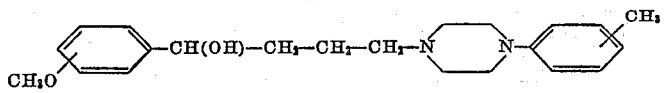
6. A compound of the structural formula
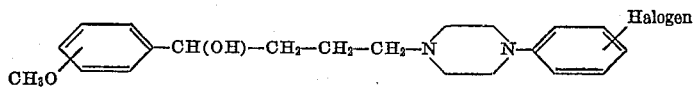
7. 1 - (4-methoxyphenyl)-4-[4-(2-chlorophenyl)piperazine]butanol.
9. 1 - (4-methoxyphenyl)-4-[4-(3-methylphenyl)piperazine]butanol.
References Cited in the file of this patent
UNITED STATES PATENTS
2,830,056    Ruschig et al. _____ Apr. 8, 1958